United States Patent [19]

Leimann et al.

[11] Patent Number: 5,621,031

[45] Date of Patent: Apr. 15, 1997

[54] SHEATHING MATERIAL FOR OPTICAL FIBERS, BASED ON POLYALKYLENE TEREPHTHALATE/POLYCARBONATE

[75] Inventors: Gerhard Leimann, Solingen; Friedemann Paul, Bergisch Gladbach; Rainer Kamps, Grub am Forst; Gerhard Lange, Munich; Walter Pfandl, Ahorn, all of Germany

[73] Assignee: Bayer AG, Leverkusen, Germany

[21] Appl. No.: 500,035

[22] Filed: Jul. 10, 1995

Related U.S. Application Data

[63] Continuation of Ser. No. 138,393, Oct. 18, 1993, abandoned.

[30] Foreign Application Priority Data

Oct. 21, 1992 [DE] Germany .......................... 42 35 463.3

[51] Int. Cl.⁶ ........................................................ C08K 5/29
[52] U.S. Cl. ............................ 524/195; 524/539; 525/451
[58] Field of Search ...................... 524/195, 539; 525/451

[56] References Cited

U.S. PATENT DOCUMENTS

| | | | |
|---|---|---|---|
| 3,887,265 | 6/1975 | Margolis et al. | 350/96 B |
| 4,022,752 | 5/1977 | Horn et al. | 260/45.75 B |
| 4,061,691 | 12/1977 | Margotte et al. | 525/439 |
| 4,188,314 | 2/1980 | Fox et al. | 524/412 |
| 4,189,422 | 2/1980 | Wakeford | 524/412 |
| 4,302,073 | 11/1981 | Bendayan et al. | 350/96.23 |
| 4,745,148 | 5/1988 | Chung et al. | 524/504 |

FOREIGN PATENT DOCUMENTS

| | | |
|---|---|---|
| 2325061 | 4/1977 | France . |
| 2513722 | 3/1975 | Germany . |
| 621135 | 1/1981 | Switzerland . |
| WO-A-9119760 | 12/1991 | WIPO . |

OTHER PUBLICATIONS

Orbit Abstract of CH–621 135.
Translation of the claims of DE–OS 25 13 722.
Abstract of JP 04 175 366.
Abstract of JP 59 006 251.

*Primary Examiner*—Kriellion S. Morgan
*Attorney, Agent, or Firm*—Connolly & Hutz

[57] ABSTRACT

The present invention relates to polyalkylene terephthalate/polycarbonate blends stabilized with carbodiimides as a sheathing material for optical fibres.

11 Claims, No Drawings

SHEATHING MATERIAL FOR OPTICAL FIBERS, BASED ON POLYALKYLENE TEREPHTHALATE/POLYCARBONATE

This application is a continuation of application Ser. No. 08/138,393 filed on Oct. 18, 1993, which is now abandoned.

The present invention relates to polyalkylene terephthalate/polycarbonate blends stabilised with carbodiimides as a sheathing material for optical fibres.

The essential object of a sheathing for an optical fibre is to protect the glass fibre located within it from external effects. Heavy demands are made on the plastic in terms of protecting the glass fibres from breakage, bending, shearing, torsion, pressure, upsetting, etc., in order to rule out an inadmissible increase in attenuation.

For example, the requirements for sheathing materials for optical waveguides include:

the absorption of axial and radial forces, i.e. high mechanical strength up to temperatures of 80° C., dimensional stability, i.e. low post moulding shrinkage due to post crystallisation, for example; no interaction, e.g. bulk absorption of filament and core filler materials; low coefficient of thermal expansion, resistance to chemicals, resistance to stress cracking, resistance to hydrolysis, e.g. must withstand the Bell Core Test, kink resistance, low coefficient of friction.

One significant problem in this respect is the requirement to sheath the inorganic glass fibres (quartz glass), which comprise isotropic, amorphous materials with an extremely low temperature coefficient of linear thermal expansion, with an organic thermoplastic in a manner which is stress-free, and to protect the fibres in use.

For example, DE-OS 2 513 722 describes a sheathing for optical fibres which is built up from two layers. The inner layer consists of polystyrene or a fluoropolymer and the outer layer consists of a polyamide or a polyterephthalate, or of polypropylene or polyethylene.

DES-OS 2 419 968 discloses polybutylene terephthalate compositions which among others may contain polycarbonate, carbodiimides are added in order to improve the impact strength and heat resistance after ageing. JP 04 175 366 describes compositions comprising polybutylene terephthalate, polycarbonate and epoxy compounds and/or polycarbodiimides for the production of wire harness connectors. A sheathing material for optical fibres is not mentioned.

DE-OS 2 355 853 (U.S. Pat. No. 3 887 265) describes an optical cable, for example, the sheathing of which consists of polyester.

JP 59 6251 describes polyester compositions which contain antimony trioxide, oxides of alkaline earth metal, carbodiimide and reinforcing filler.

In principle there are two structural or process-related possibilities for manufacturing a lose tube system:

1. The manufacture of loose tube systaems on a disc as a true two-layer system with an amorphous inner layer such as polyamide or polycarbonate, for example, and a partially crystalline outer layer of polybutylene terephthalate for protection. The disadvantages of this system are its unfavourable economics and the enormous susceptibility to stress cracking of the amorphous materials (DE-OS 25 13 722).

2. The manufacture of loose tube systems on a spool as a double layer or single layer with partially crystalline materials such as polybutylene terephthalate, polyamide 12 or polypropylene copolymers, for example. In this method of manufacture, deleterious post crystallisation is substantially prevented by the fixed winding on to the spool. The disadvantage of this process is that it is restricted in terms of the lengths which can be manufactured.

Polybutylene terephthalate, which is currently very widely used for single layer sheathing, does not fully meet the requirements, particularly in relation to the following points: dimensional stability, resistance to hydrolysis and temperature resistance (there is a decrease in mechanical strength at the low glass transition temperature).

The object of the present invention is to develop a polymer blend as sheathing material for optical fibres which combines the favourable properties of amorphous and partially crystalline products without their unfavourable properties becoming apparent, and which in addition has good hydrolytic stability.

The present invention relates a sheathing material for optical fibres, comprising a polymer blend of A) 40 to 80 weight %, preferably 45 to 75 weight %, most preferably 50 to 70 weight %, of a polyalkylene terephthalate, B) 20 to 60 weight %, preferably 25 to 55 weight %, most preferably 30 to 50 weight %, of an aromatic polycarbonate, and c) 0.1 to 6 weight %, preferably 0.2 to 3 weight %, most preferably 0.3 to 1.5 weight %, of a carbodiimide corresponding to formula (I)

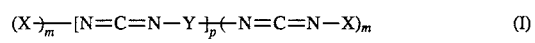

where

X and Y represent aromatic or arylaliphatic hydrocarbon radicals with 6 to 20 carbon atoms, which bear aromatic, aliphatic and/or cycloaliphatic substituents with at least two C atoms, preferably branched or cyclic aliphatic radicals with at least three C atoms, in at least one ortho position with respect to the carbodiimide group; the carbodiimide group(s) is (are) bonded to aromatic carbon; p=0 to 50 (on average); m=0 or 1 and X may contain free isocyanate group(s), wherein the sum of A+B+C=100.

The blend has a pronounced two-phase nature and has sufficient thermal stability for this structure to be maintained in the optical fibre sheathing. The two-phase nature is characterized in that a) the polycarbonate fraction still significantly jointly determines the behaviour of the shear modulus, in such a way that the polycarbonate characteristic is also apparent in addition to that of the polybutylene terephthalate; and b) the displacement or lowering of the melting point and the decrease in the enthalpy of fusion due to processing should preferably not exceed the following values:

enthalpy of fusion: 50% lowering of melting point: 20° C.

Moreover, significant melting peaks or a pronounced solidification peak, which stem from the partially crystalline polyalkylene terephthalate phase, are observed during dynamic DSC measurements both on the granular material and on finished parts (sheathing), during both heating phases and during the intermediate cooling phase.

In addition, it has surprisingly been found that carbodiimides exert a good stabilising effect in the blends described above comprising polyalkylene terephthalate and polycarbonate. This is surprising, since although carbodiimides are known as hydrolysis stabilizers in polyalkylene terephthalates, they are also known that to be unsuitable for use as hydrolysis stabilizers in polycarbonates.

A high degree of stabilization is required if polyalkylene terephthalate/polycarbonate blends are to be suitable for use as optical fibre sheating. This high degree of stabilization can be achieved according to the invention by means of carbodiimides. Stabilization of the polyester by means of a reduced carboxyl number, as is known in the use of pure PBT as a sheathing material for optical fibres, is insufficient, particularly as the carboxyl number is significantly increased, in a manner which cannot be accurately controlled, due to thermal loading during processing.

In the sense of the invention, polyalkylene terephthalates (component A) are the reaction products obtained from aromatic dicarboxylic acids or their reactive derivatives (e.g. dimethyl esters or anhydrides) and aliphatic, cycloaliphatic or arylaliphatic diols, and mixtures of these reaction products. They may be prepared by known methods (Kunststoff-Handbuch, Volume VIII, pages 695 et seq., Carl Hanser Verlag, Munich, 1973).

Preferred polyalkylene terephthalates contain at least 80 mole %, preferably 90 mole % (based on the dicarboxylic acid component) of terephthalic acid radicals, and at least 80 mole %, preferably at least 90 mole % (based on the diol component) of ethylene glycol and/or 1,4-butanediol radicals.

In addition to terephthalic acid radicals, the preferred polyalkylene terephthalates may contain up to 20 mole % of radicals of other aromatic or cycloaliphatic dicarboxylic acids with 8 to 14 C atoms, or aliphatic dicarboxylic acids with 4 to 12 C atoms, such as phthalic acid, isophthalic acid, naphthalene-2,6-dicarboxylic acid, 4,4'-diphenyldicarboxylic acid, succinic acid, adipic acid, sebacic acid, azelaic acid or cyclohexanediacetic acid radicals, for example.

In addition to ethylene glycol radicals or 1,4-butanediol radicals, the preferred polyalkylene terephthalates may contain up to 20 mole %, preferably up to 10 mole % of other aliphatic diols with 3 to 12 C atoms or cycloaliphatic diols with 6 to 21 C atoms, e.g. radicals of 1,3-propanediol, 2-ethyl-1,3-propanediol, neopentyl glycol, 1,5-pentanediol, 1,6-hexanediol,cyclohexane-di-1,4-methanol,3 -ethyl-2,4-pentanediol, 2-methyl-2,4-pentanediol,2,2,4-trimethyl- 1,3-pentanedioland2,2,4-trimethyl-1,6-pentanediol, 2-ethyl-1,3-hexanediol, 2,2-diethyl-1,3-propanediol, 2,5-hexanediol, 1,4-di-(β-hydroxyethoxy)-benzene, 2,2-bis-(4-hydroxy-cyclohexyl)-propane, 2,4-dihydroxy1,1,3,3 -tetramethyl cyclobutane, 2,2-bis-( 3 -β-hydroxyethoxyphenyl)-propane and 2,2-bis-(4-hydroxypropoxyphenyl)-propane (DE-OSS 24 07 647, 24 07 776, 27 15 932).

The polyalkylene terephthalates may be branched by incorporating relatively small amounts of trihydric or tetrahydric alcohols, or tribasic or tetrabasic carboxylic acids, as described in DE-OS 19 00 270 and in U.S. Pat. No. 3,692,744, for example. Examples of preferred branching agents comprise trimesic acid, trimellitic acid, trimethylolethane, trimethylolpropane and pentaerythritol.

Particularly preferred polyalkylene terephthalates are those which have been prepared solely from terephthalic acid or its reactive derivatives (e.g. its dialkyl esters) and ethylene glycol and/or 1,4-butanediol (polyethylene terephthalate, polybutylene terephthalate), and mixtures of these polyalkylene terephthalates.

The polyalkylene terephthalates which are preferably used as component A generally have an intrinsic viscosity from 0.4 to 1.6 dl/g, preferably 0.6 to 1.5 dl/g, most preferably 0.7 to 1.4 dl/g, measured in each case in phenol/o-dichlorobenzene (1:1 weight ratio) at 25 C.

Aromatic polycarbonates (component B) in the sense of this invention are understood to mean homopolycarbonates, copolycarbonates and mixtures of these polycarbonates.

In general, the diphenols which are preferred for the preparation of the aromatic polycarbonates A correspond to the formula

HO—Z—OH    (I)

where Z denotes a divalent mono- or multinuclear aromatic $C_6$–$C_{30}$ radical, the two OH groups each being directly bonded to a C atom of an aromatic system.

Particularly preferred diphenols correspond to the formula

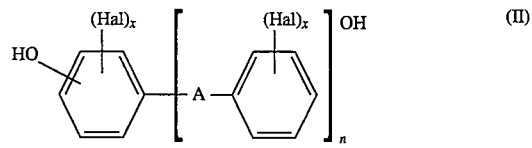

where

A represents a single bond, $C_{1-C5}$ alkyl groups, $C_2$ –$C_5$ alkyliden groups,, $C_5$–$C_6$ cycloalkyl or cycloalkyliden groups, —O—, —S—,

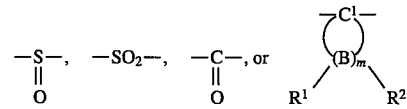

Hal represents chlorine or bromine, x is zero, 1 or 2, and n is zero or 1, $R^1$ and $R^2$ represent hydrogen or $C_{1-C6}$ alkyl groups, particularly methyl, which may be selected individually and independently of each other for each B, B represents carbon and m is an integer from 4 to 7, preferably 4 or 5.

Particular mention should be made of the following diphenols:

2,2-bis-(4-hydroxyphenyl)-propane,
1,1 -bis-(4-hydroxyphenyl )-cyclohexane,
2,2-bis-(3,5-dichloro-4-hydroxyphenyl)-propane,
2,2-bis-(3,5-dibromo-4-hydroxyphenyl)-propane,
2,2-bis-(3,5-dimethyl-4-hydroxyphenyl)-propane,
bis-(3,5dimethyl-4-hydroxyphenyl)-methane,
bis-(4-hydroxyphenyl)-sulphide,
1,1-bis-(4-hydroxyphenyl)-3,3,5-trimethylcyclohexane.

The diphenols may be used both individually and as a mixture.

Particularly preferred aromatic polycarbonates comprise polycarbonates based on 2,2-bis-(4-hydroxyphenyl)-propane or on one of the other diphenols cited as being preferred. Diphenols which are most particularly preferred comprise those based on 2,2-bis-(4-hydroxyphenyl)-propane,2,2-bis-(3,5-dimethyl-4-hydroxyphenyl)-propane or 1,1-bis-(4-hydroxyphenyl)-3,3,5-trimethylcyclohexane, or mixtures of 2,2-bis-(4-hydroxyphenyl)-propane and 1,1-bis-(4-hydroxyphenyl)-3,3,5-trimethylcyclohexane.

The aromatic polycarbonates may be branched by the addition of smal amounts, preferably from 0.05 to 2.0 mole % (based on the diphenols used) of compounds with a functionality of three or more than three, for example those with three or more than three phenolic hydroxyl groups.

In general, the aromatic polycarbonates have an average molecular weight $\overline{M}_w$ of 10,000 to 200,000, preferably 20,000 to 80,000, as determined by light scattering.

Chain terminators, such as phenols, halogenated phenols or alkyl phenols, for example, may be added in calculated amounts in the known manner in order to adjust the molecular weight $\overline{M}_w$ of the polycarbonates.

Particularly preferred chain terminators, for examnple, comprise phenol, p-chlorophenol, p-tert.-butyl phenol or 2,4,6-tribromophenol, and also long chain alkyl phenols, such as 4-(1,3-tetramethylbutyl)-phenol according to DE-OS 2 842 005, or monoalkyl phenols or dialkyl phenols with a total of 8 to 20 C atoms in the alkyl substituents according to DE-OS 3 506 472, such as 3,5-di-tert.-butyl phenol, p-iso-octyl phenol, p-tert.-octyl phenol, p-dodecyl phenol, 2-(3,5-dimethylheptyl)-phenol and 4-(3,5-dimethyl-heptyl)-phenol.

The amount of chain terminators to be added is generally between 0.5 and 10 mole %, based on the sum of the diphenols used in each case.

The aromatic polycarbonates may be prepared by known methods, e.g. by fusion transesterification of a corresponding bisphenol with diphenyl carbonate, and in a solution of bisphenols and phosgene. The solution may be homogeneous (pyridine process) or heterogeneous (two-phase interfacial process) (see H. Schnell, "Chemistry and Physics of Polycarbonates", Polymer Reviews, Vol. IX, page 33 et seq., Interscience Publishers, 1964).

Component C

The preferred carbodiimides corresponding to formula (I) are those in which the aromatic radicals X, and Y, for expample phenyl, comprise (cyclo)aliphatic and/or aromatic radicals, for example $C_1$–$C_6$ alkyl groups or phenyl groups, as substituents in both ortho positions or in both ortho positions and in para position with respect to the carbodiimide group, wherein one of these ortho substituents may be a methyl group. Particularly preferred compounds are those of which the aromatic rings X and Y comprise (cyclo)aliphatic radicals as substituents in the two positions adjacent to the carbodiimide group, wherein one of these ortho substituents may be a methyl group and the other contains at least two C atoms.

The most particularly preferred carbodiimides are those which bear two or three, respectively, substituents positioned adjacent or adjacent and in para position to the carbodiimide group, at least one of which is a branched aliphatic chain with at least three C atoms, or a cycloaliphatic radical with 5 or 6 C atoms; p is preferably 0 to 40.

The carbodiimides may be used as dimeric, oligomeric or polymeric compounds or as mixtures of these. Polymeric carbodiimides ($p \geq 11$) are preferably used.

Substituents on the aromatic ring adjacent to the carbodiimide group which are suitable according to the invention comprise $C_2$–$C_{20}$ alkyl and/or cycloalkyl groups, such as ethyl, propyl, isopropyl, sec.-butyl, tert.-butyl, cyclohexyl or dodecyl radicals, and also aryl and aralkyl radicals with 6 to 15 C atoms, such as phenyl, tolyl, benzyl and naphthyl radicals, etc.

Very particularly preferred carbodiimides are those which are substituted by isopropyl in both ortho-positions or in both ortho position and in para position, respectively.

The following carbodiimides are cited by way of example:

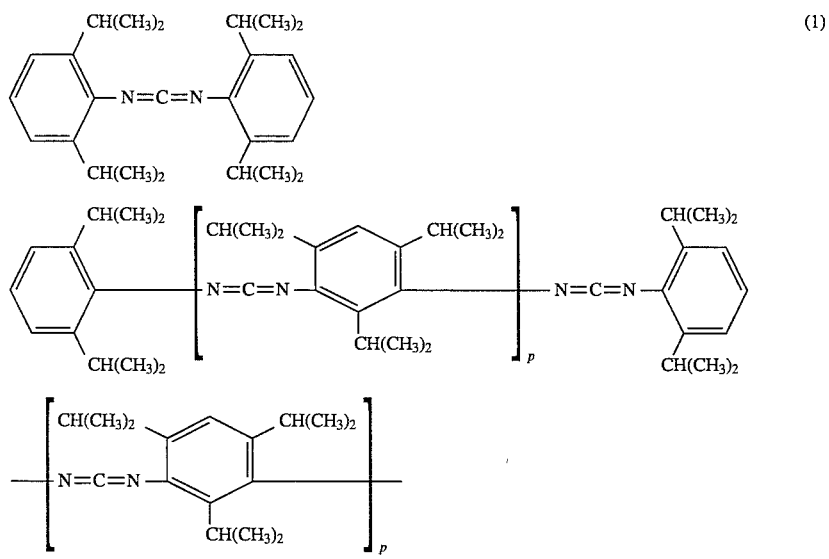

The carbodiimides corresponding to formula (I) may be prepared by methods known in the art. One possible method of preparation is described in DAS 25 37 685, for example. According to the teaching of this patent specification, organic polyisocyanates are partially reacted to the desired extent in the presence of a suitable phosphorus compound, and the catalyst is subsequently deactivated with a suitable halide, e.g. an acid halide.

Polycarbodiimides may contain NCO-groups which are reactive and monoactive isocyanates which are bound in a complex form. Polycarbodiimides may be prepared according to the methods described in the French patent 1 180 307 by polyisocyanates with catalytic amounts of phospholines, phospholidines and their oxides and sulfides. Furthermore, polycarbodiimides may be prepared by di- and polyisocyanates which bear one or two aryl or alkyl subsituents in ortho position to the NCO-groups wherein at least one of the substituents should have at least 2 carbon atoms using tert.-amines, basic reacting metal compounds, carbon acid metal salts and non-basic organo metal compounds. Polycarbodiimides which still contain NCO-groups may be modified in that the NCO group may be removed by reactive hydrogen containing compounds such as alcohols, phenols or amines (see DE-AS 1 156 401 and DE-OS 2 419 968.

The polymer blends according to the invention may contain the usual additives, such as internal lubricants, demoulding agents, nucleating agents, antistatic agents, stabilizers, fillers and reinforcements, flame-retardants, colorants, pigments and antioxidants.

The polymer blends according to the invention may be produced by mixing the components at high temperature, preferably in the range from 200° to 330° C., i.e. in the usual apparatus such as internal kneaders, extruders, double screw mixers or Buss kneaders, for example, and may be melt-compounded or melt-extruded. The components may be introduced into the mixing installation simultaneously or in succession. For the production of the fibre sheathing, the polymer blend described may be used as a) homogeneous granules, b) as a mechanical mixture of an unstabilized polyalkylene terephthalate/PC blend with granular carbodiimide concentrates, c) as a mechanical mixture of polyalkylene terephthalate granules, polycarbonate granules and granular carbodiimide concentrates, and d) as a mechanical mixture of all the individual components, both in pure form and as concentrates.

The sheathing is manufactured by processes which are generally known (extrusion processes).

The sheathing may have any desired (geometric) cross-sectional shape.

EXAMPLES

Components Used

A polybutylene terephthalate (PBT)
 intrinsic viscosity 1.4 dl/g (measured in phenol/o-dichlorobenzene (1:1 weight ratio) at 25° C.)
polycarbonate based on bisphenol A
 Relative solution viscosiy 1.335 (DIN 51 568, Part 3)
C Stabaxol® KE 8457 (Rhein Chemie Rheinau GmbH). A polymeric carbodiimide (Stabaxol P 100) in a thermoplastic polymer based on polybutylene terephthalate (intrinsic viscosity 1.25 dl/g, measured in phenol o-dichlorobenzene (1:1 weight ratio) at) 25° C.)
Content of active ingredient: about 20%

The components were mixed in a ZSK 83 Werner und Pfleiderer double-shaft extruder.

TABLE 1

Polymer blend composition

| Example | PBT | PC | Carbodiimide | Additives* |
|---|---|---|---|---|
| A | 54.4 | 45 | 0.5 | 0.1 |
| B | 54.15 | 45 | 0.75 | 0.1 |
| C | 53.9 | 45 | 1.0 | 0.1 |
| D (Comparison) | 54.9 | 45 | — | 0.1 |
| E | 54.24 | 45 | 0.75 | 0.01 |
| F (Comparison) | 59.99 | 40 | — | 0.01 |

*The usual additives

TABLE 2

Elongation at break (in %) from the tensile testing of F 3 × 0.7 test-pieces (injection-moulded 70% proportional specimens) in accordance with DIN 53455; test velocity 35 mm/minute.

| Example | Original value | After storage for 35 days in water at 80° C. | After storage for 35 days in hot air at 130° C. |
|---|---|---|---|
| A | 140 | 30 | 102 |
| B | 120 | 35 | 75 |
| C | 110 | 40 | 85 |
| D (Comparison) | 70 | 2 | 5 |

TABLE 3

Elongation at break (in %) in accordance with DIN 53455, of extruded test-pieces (tensile test bars Type S 2 punched from strip in accordance with DIN 53504); test velocity 25 mm/minute.

| Example | Original value | After storage for 35 days in water at 80° C. | After storage for 35 days in filament and core filling material at 80° C. |
|---|---|---|---|
| E | 160 | 130 | 160 |
| F (Comparison) | 130 | not measurable | — |

TABLE 4

Elongation at break (in %) of optical fibre sheathing (tubes); test velocity 50 mm/minute

| Example | Original value | After storage for 28 days in water at 80° C. | After storage for 28 days in hot air at 100° C. |
|---|---|---|---|
| E | 160 | 140 | 140 |

It follows from the Tables that the polymer blends according to the invention exhibit excellent compliance with the requirements for use as a sheathing material for optical fibre, in terms of their long-term behaviour (ageing caused by hydrolysis and hot air, measured resistance with respect to storage in filament and core filling materials). In contrast, the unstabilized PBT/PC blends exhibit considerably worse behaviour.

We claim:

1. A sheathing material for optical fibres, comprising a polymer blend of

A) 40 to 80 weight percent of a polyalkylene terephthalate,

B) 20 to 60 weight percent of an aromatic polycarbonate based on bisphenol A, and C) 0.1 to 6 weight percent of a carbodiimide corresponding to the following formula

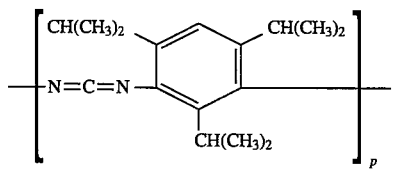

where p=0 to 50 (on average) and the sum of A+B+C=100.

2. A sheathing material for optical fibres, consisting essentially of a polymer blend of A) 40 to 80 weight percent of a polyalkylene terephthalate, B) 20 to 60 weight percent of an aromatic polycarbonate based on hisphenol A, C) 0.1 to 6 weight percent of a carbodiimide corresponding to the following formula

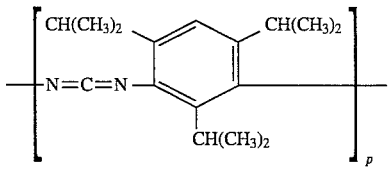

where p=0 to 50 (on average) and the sum of A+B+C=100, and

D) at least one additive selected from the group consisting of internal lubricants, demoulding agents, nucleating agents, antistatic agents, stabilizers, fillers, reinforcements, flame-retardants, colorants, pigments and antioxidants.

3. A sheathing material for optical fibres according to claim 1, wherein

A) comprises 45 to 75 weight % of said polyalkylene terephthalate,

B) comprises 25 to 55 weight % of said aromatic polycarbonate based on bisphenol A, and C) comprises 0.2 to 3 weight % of said carbodiimide.

4. A sheathing material for optical fibres according to claim 1, where the polymer blend has a pronounced two-phase nature.

5. A sheathing material for optical fibres according to claim 4, wherein the two-phase nature is characterized in that a) the polycarbonate fraction still significantly jointly determines the behaviour of the shear modulus, in such a way that the polycarbonate characteristic is also apparent in addition to that of the polyalkylene terephthalate; and b) the displacement or lowering of the melting point and the decrease in the enthalpy of fusion due to processing should not exceed the following values:
enthalpy of fusion: 50%
lowering of melting point: 20° C.

6. A method of using the polymer blends according to claim 1, wherein the polymer blends are formed into a sheathing material for optical fibres.

7. A process for manufacturing optical fibre sheathing, characterized in that the components according to claim 1 are mixed at a temperature of about 200° to 330° C., melt-compounded and melt-extruded.

8. A sheathing material for optical fibres according to claim 2, wherein

A) comprises 45 to 75 weight % of said polyalkylene terephthalate,

B) comprises 25 to 55 weight % of said aromatic polycarbonate based on bisphenol A, and C) comprises 0.2 to 3 weight % of said carbodiimide.

9. A sheathing material for optical fibres according to claim 2, wherein

A) comprises 50 to 70 weight % of said polyalkylene terephthalate,

B) comprises 30 to 50 weight % of said aromatic polycarbonate based on bisphenol A, and C) comprises 0.3 to 1.5 weight % of said carbodiimide.

10. A sheathing material for optical fibres according to claim 1, wherein

A) comprises 50 to 70 weight % of said polyalkylene terephthalate,

B) comprises 30 to 50 weight % of said aromatic polycarbonate based on bisphenol A, and C) comprises 0.3 to 1.5 weight % of said carbodiimide.

11. A sheathing material for optical fibres, consisting essentially of a polymer blend of A) 40 to 80 weight percent of a polyalkylene terephthalate, B) 20 to 60 weight percent of an aromatic polycarbonate based on bisphenol A, and C) 0.1 to 6 weight percent of a carbodiimide corresponding to the following formula

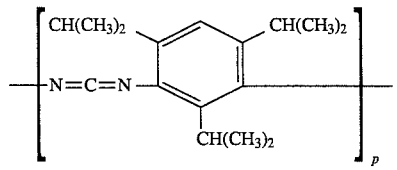

where p=0 to 50 (on average) and the sum of A+B+C=100.

* * * * *

UNITED STATES PATENT AND TRADEMARK OFFICE
CERTIFICATE OF CORRECTION

PATENT NO. : 5,621,031
DATED : Apr. 15, 1997
INVENTOR(S) : Leimann, et al.

It is certified that error appears in the above-identified patent and that said Letters Patent is hereby corrected as shown below:

On the cover page, in section [73] Assignee:, "Bayer AG, Leverkusen, Germany" should be changed to --Bayer AG, Leverkusen, Germany and Siemens AG, Munchen, Germany--.

Signed and Sealed this

Sixteenth Day of June, 1998

Attest:

BRUCE LEHMAN

Attesting Officer    Commissioner of Patents and Trademarks